US00RE36423E

United States Patent [19]

Komatsubara et al.

[11] E Patent Number: Re. 36,423

[45] Reissued Date of Patent: Dec. 7, 1999

[54] METHOD OF MANUFACTURING GRAIN-ORIENTED SILICON STEEL SHEET EXHIBITING EXCELLENT MAGNETIC CHARACTERISTICS OVER THE ENTIRE LENGTH OF COIL THEREOF

[75] Inventors: Michiro Komatsubara; Kazuaki Tamura; Masako Hisata; Masaki Kawano, all of Okayama, Japan

[73] Assignee: Kawasaki Steel Corporation, Japan

[21] Appl. No.: 09/013,332

[22] Filed: Jan. 26, 1998

Related U.S. Patent Documents

Reissue of:

[64] Patent No.: 5,679,178
Issued: Oct. 21, 1997
Appl. No.: 08/505,821
Filed: Jul. 20, 1995

[30] Foreign Application Priority Data

Jul. 22, 1994 [JP] Japan ..... 6-171104
Jun. 22, 1995 [JP] Japan ..... 7-156024

[51] Int. Cl.[6] ..... H01F 1/04

[52] U.S. Cl. ..... 148/113; 148/111

[58] Field of Search ..... 148/111, 113

[56] References Cited

U.S. PATENT DOCUMENTS 4,421,574 12/1983 Lyudkovsky ..... 148/111
5,354,389 10/1994 Arai et al. ..... 148/111

FOREIGN PATENT DOCUMENTS 0526834 2/1993 European Pat. Off. ..... 148/111

*Primary Examiner*—John Sheehan
*Attorney, Agent, or Firm*—Austin R. Miller

[57] ABSTRACT

A method of manufacturing a grain-oriented silicon steel sheet exhibiting excellent magnetic characteristics over the entire length of a coil thereof, which involves hot rolling a silicon steel slab containing aluminum and suitable for making a grain-oriented silicon steel sheet; annealing the steel sheet, as the need arises; cold rolling the steel sheet to a final thickness, the cold rolling including an intermediate annealing process; performing a heat effect treatment before, during or after the cold rolling; performing a decarburizing annealing; and performing a final annealing process. The method inhibits oxidation of the surfaces of the steel sheet during the cold rolling.

3 Claims, 4 Drawing Sheets

METHOD OF MANUFACTURING GRAIN-ORIENTED SILICON STEEL SHEET EXHIBITING EXCELLENT MAGNETIC CHARACTERISTICS OVER THE ENTIRE LENGTH OF COIL THEREOF

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method of manufacturing a grain-oriented silicon steel sheet exhibiting excellent magnetic characteristics, and, more particularly, a method of stabilizing the magnetic characteristics in the lengthwise direction of a coil of a grain-oriented silicon steel sheet.

2. Description of the Related Art

Grain-oriented silicon steel sheet is used in transformer cores, generators and the like, and therefore requires excellent, magnetic characteristics such as high magnetic flux density (usually indicated by value $B_8$ at a magnetic-field intensity of 800 A/m) and small iron loss (usually indicated by 50 Hz alternating iron loss value $W_{17/50}$ at the maximum magnetic flux density of 1.7 T).

Much work has gone into minimizing iron loss in grain-oriented silicon steel, and improvements have resulted from (1) reducing the thickness of the steel sheet, (2) increasing Si content, and (3) reducing the diameters of crystal grains. Such steps have enabled the production of a material that exhibits an iron loss $W_{17/50}$ of only 0.90 W/kg.

However, reducing iron loss even further has proven difficult because further reductions in the steel sheet thickness causes defects to arise during secondary recrystallization, thus increasing iron loss. Similarly, reducing crystal grain diameters below an average diameter of about 4 mm to 8 mm also causes iron-loss-increasing defects to arise during secondary recrystallization. Moreover, increasing Si content negatively affects the ease with which cold rolling can be performed.

However, by using a so-called magnetic domain refining technique in which a local distortion is introduced into the surface of the steel sheet, or grooves are formed on the same, iron loss can be considerably reduced.

That is, in the case of the foregoing material having an iron loss $W_{17/50}$ of 0.90 W/kg, introduction of appropriate local distortion on the surface of the steel sheet (by a plasma jetting method or the like) has reduced iron loss of 0.80 W/kg. This magnetic domain refining technique also eliminates the need to reduce crystal grain diameters in the final product, as is required in conventional techniques. The quality of material produced through the magnetic domain refining technique depends upon the thickness of the steel sheet, the Si content, and the magnetic flux density.

Since Si content cannot be increased without negatively affecting the working properties necessary for the steel, minimization of iron loss requires increasing the magnetic flux density of a thin material.

To improve the magnetic flux density of a grain-oriented silicon steel sheet, the orientation of crystal grains of the product must be highly integrated in orientation (110) [001], known as the Goss orientation. Such Goss oriented grains can be obtained through a secondary recrystallization phenomenon created during a final annealing process.

In such a secondary recrystallization, selective crystal grain growth is promoted in crystal grains having the orientation (110) [001], while growth of crystal grains in other orientations is minimized by adding an inhibitor. The inhibitor forms a fine deposited and dispersed phase in the steel, thereby selectively inhibiting growth of grains.

Since the selective growth of Goss oriented grains produces a material exhibiting high magnetic flux density, there has been much research and development regarding inhibitors. A particularly effectively AlN inhibitor has been disclosed in Japanese Patent Publication No. 46-23820, wherein a steel sheet containing Al is subjected to a rapid cooling process after it has been annealed but before a final cold rolling process is performed. The final cold rolling is performed using a high rolling reduction ratio of 80% to 95% to produce a steel sheet having a thickness of 0.35 mm and a high magnetic flux density $B_{10}$ of 1.981 T ($B_8$ of about 1.95 T).

However, steel sheet produced by the above-described method suffers from the problem that high magnetic flux density cannot be maintained when the sheet thickness is reduced.

That is, (110) [001]oriented grains, which form the nuclei of the secondary recrystallization, are not distributed uniformly in the direction of the thickness of the steel sheet. Instead, the grains are concentrated near the surface layer of the steel sheet. Therefore, if the thickness of the sheet is reduced, (110) [001]orientated grains are readily affected by the atmosphere in which the final annealing process is performed, such that the secondary recrystallization becomes unstable. Thus, a method of stabilizing the magnetic characteristics has been widely sought after.

Accordingly, a variety of techniques for manufacturing grain-oriented silicon steel sheet having excellent and table magnetic characteristics have been developed. For example, a technique in which an aging heat treatment is performed at 50° C. to 350° C. for one or more minutes during the rolling process (Japanese Patent Publication No. 54-13846), a technique in which the steel sheet is maintained at 300° C. to 600° C. for 1 to 30 seconds during the cold rolling process (Japanese Patent Publication No. 54-29182) and a warm rolling technique in which the temperature of the inlet portion of the rolling stand is controlled to 150° C. to 300° C. have all been developed. However, all of the foregoing techniques are unsatisfactory methods for manufacturing industrial products because, while the coils manufactured from steels made in accordance with the above-described techniques exhibit excellent magnetic characteristics at either end of the coils (the leading and tailing ends of the steel), the magnetic characteristics in the central portion of the coil are deteriorated.

As described above, if a warm rolling process (for raising the temperature of the steel sheet) or an aging heat treatment is performed during the cold rolling of a grain-oriented silicon steel sheet containing Al, the magnetic flux density markedly deteriorates except the two ends of the product.

After investigating the foregoing problem, we discovered that, although the secondary recrystallization is completed in all regions of the product, the orientation of the crystal grains in the regions in which the magnetic flux density deteriorates departs considerably from the orientation (110) [001].

As shown in FIG. 1, the measured change in the angle of deviation in plane from the orientation [001](the "angle of deviation" is hereinafter referred to as "angle $\alpha$") increases except the two ends of the coil, thus causing the magnetic flux density to be lowered.

This phenomenon occurs when cold rolling is performed at a warm temperature range from about 100° C. to 300° C., or when an aging or heat treatment is performed during the rolling process. The foregoing phenomenon often takes place in inverse proportion to the thickness of the steel sheet.

OBJECTS OF THE INVENTION

An object of the present invention is to provide a method of advantageously manufacturing a grain-oriented silicon steel sheet that is capable of maintaining excellent magnetic characteristics throughout the overall length of a coil of a grain-oriented silicon steel [plate] *sheet* even when a heat effect treatment, such as a warm rolling process or a heat treatment for aging, is employed during cold rolling of a grain-oriented silicon steel [plate] *sheet* containing Al.

Other objects of the invention will become apparent from the description provided.

SUMMARY OF THE INVENTION

According to one aspect of the present invention, there is provided a method of manufacturing a grain-oriented silicon steel [plate] *sheet* exhibiting excellent magnetic characteristics over the entire length of a coil thereof. The method involves hot-rolling a silicon steel slab that contains aluminum into a steel [plate] *sheet*, annealing the steel [plate] *sheet* as the need arises, and cold rolling the steel [plate] *sheet* at least once to a final thickness, the cold rolling [operation] *comprising one stage or two stages* including an intermediate annealing process. A heat effect treatment is also performed before, during or after the cold rolling process. A decarburizing annealing process is then performed, followed by a final annealing process. Oxidation of the steel [plate] *sheet* surface is thereby inhibited during the cold rolling process.

According to another aspect of the present invention, a method of manufacturing a grain-oriented silicon steel [plate] *sheet* exhibiting excellent magnetic characteristics over the entire length of a coil thereof is provided. The method involves limiting the concentration of oxygen in the atmosphere in which the heat effect treatment is performed to about 10 vol % or lower.

According to another aspect of the present invention, a method of manufacturing a grain-oriented silicon steel [plate] *sheet* exhibiting excellent magnetic characteristics over the entire length of a coil thereof is provided. The method involves performing a process for inhibiting local oxidation of the steel [plate] *sheet* surface occurring when a cold rolling process that includes the heat effect treatment is performed.

According to another aspect of the present invention, a method of manufacturing a grain-oriented silicon steel [plate] *sheet* exhibiting excellent magnetic characteristics over the entire length of a coil thereof is provided. The method involves reducing the liquid existing on the surfaces of the steel [plate] *sheet* by a process performed for at least one pass among rolling passes in the cold rolling process. The process inhibits oxidation being performed in a *downstream* region from the [discharge side] *roll bite outlet* of the rolling process to the position at which the steel [plate] *sheet* is wound.

According to another aspect of the present invention, a method of manufacturing a grain-oriented silicon steel [plate] *sheet* exhibiting excellent magnetic characteristics over the entire length of a coil thereof is provided. The method involves adding an inhibitor for inhibiting oxidation of a steel [plate] *sheet* to rolling oil, roll coolant oil and/or strip coolant oil used in the cold rolling process.

DESCRIPTION OF THE PREFERRED EMBODIMENTS

In our investigations, we discovered that during the final annealing process, a change in the nitrogen components along the lengthwise direction of the coil occurs. That is, after performing the final annealing process, the content of nitrogen at the two ends of the coil remained substantially unchanged, but an increase in nitrogen content of 3 ppm to 15 ppm in the other portions was observed.

In the case of grain-oriented silicon steel [plate] *sheet* containing Al, the initial stage of the final annealing process is performed in an atmosphere containing nitrogen to "nitride" the steel [plate] *sheet*. However, what influence nitriding had on the secondary recrystallization had been unclear.

Therefore, we investigated the influence of nitriding upon secondary recrystallization, and in particular its effect on the magnetic flux density of the product steel.

Figure 1:
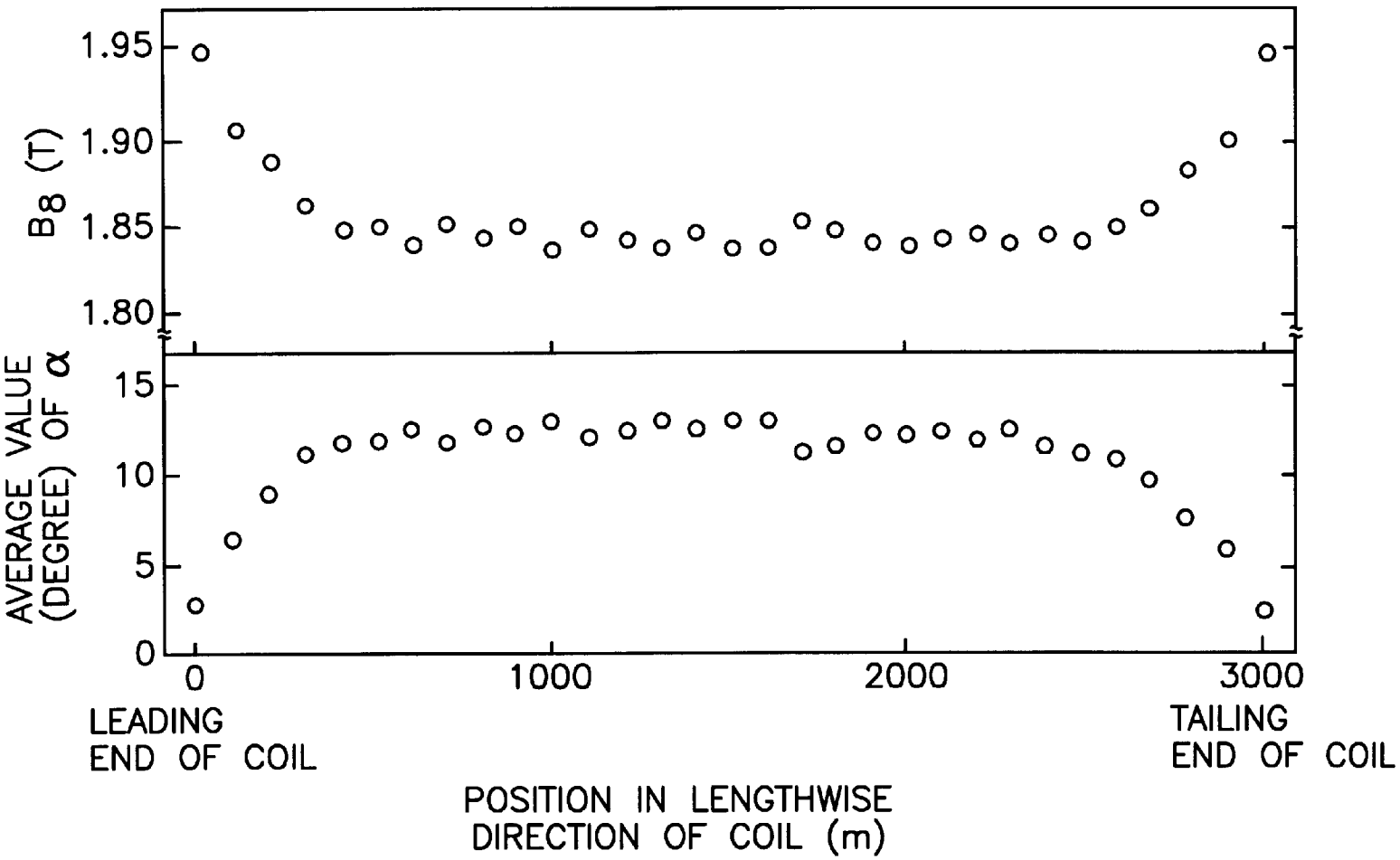
FIG. 1 PRIOR ART
FIG. 1 is a graph showing distribution of magnetic flux densities $B_8$ along the lengthwise direction of a coil produced in accordance with a prior art method, and the distribution of deviation angles $\alpha$ from the orientation (110) [001]along the lengthwise direction of a coil.
Figure 2:
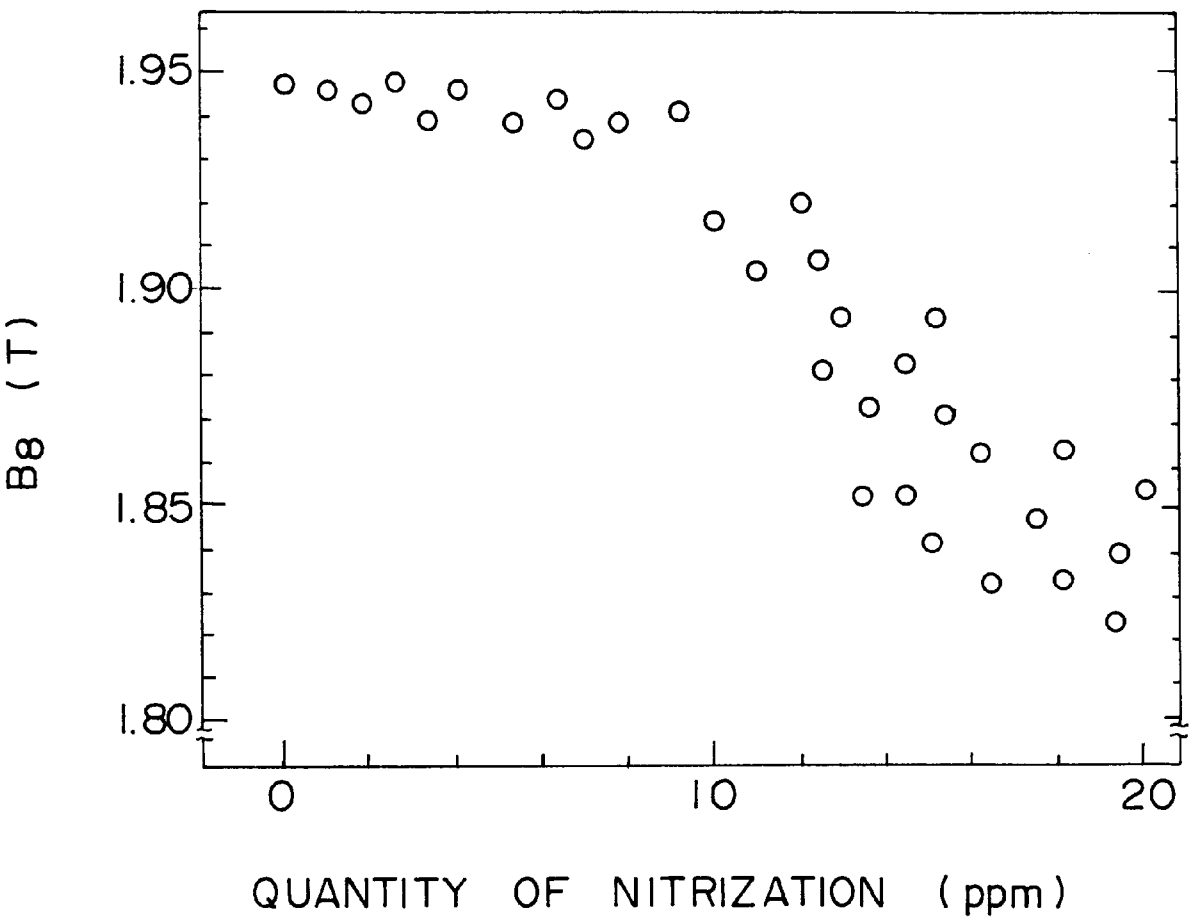
FIG. 2 is a graph showing the relationship between the quantity of nitriding of the steel [plate] *sheet* measured immediately before secondary recrystallization is initiated and the magnetic flux density measured after the secondary recrystallization has been performed.

FIG. 2 shows results of investigation of the relationship between the magnetic flux density observed after secondary recrystallization and increases in the quantity of nitrogen (the quantity of nitriding) created by the nitriding process. To conduct the investigation, a [grain-oriented] silicon steel [plate] *sheet* containing Mn by 0.07 wt %, Al by 0.025 wt %, Sb by 0.025 wt %, Se by 0.020 wt % and N by 0.0085 wt %, which had been decarburized, primary-recrystallized and annealed, was subjected to a nitriding process at 750° C. for 30 seconds in an atmosphere in which $NH_3$ was, at a variety of ratios, mixed with gas consisting of 50 vol % $N_2$ and 50 vol % $H_2$[/]. Test samples in which the content of nitrogen in the steel was thusly raised were then secondary-recrystallized in an experiment chamber.

As can be seen in FIG. 2, increases in the quantity of nitriding in the steel caused decreases in magnetic flux density. Notably, if the quantity of nitrogen exceeded 10 ppm, the magnetic flux density of the steel was sharply reduced.

The investigation confirmed that deterioration in the magnetic flux density was caused by nitriding of the steel [plate]

*sheet* at the time of the final annealing process. Furthermore, a close relationship between magnetic flux deterioration observed in the steel [plate] *sheet* and the method of cold rolling was found.

In another investigation, five hot-rolled coils, each of which was made of [grain-oriented] silicon steel that contained C by 0.075 wt %, Si by 3.26 wt %, Mn by 0.07 wt %, P by 0.006 wt %, Al by 0.027 wt %, Sb by 0.025 wt %, Se by 0.020 wt % and N by 0.0085 wt %, were annealed at 1000° C. for 90 seconds; the hot-rolled coils were then [washed] *pickled* with an acid; cold rolled (as a first cold rolling process) to have a thickness of 1.50 mm; subjected to an intermediate annealing process at 1120° C. for 60 seconds; rapidly cooled with [mist] *water*; again [washed] *pickled* with an acid; and cold rolled a second time to have a thickness of 0.22 mm.

When the thickness of the steel [plate] *sheet* was at 0.75 mm during the second cold rolling process, an aging heat treatment was performed at 300° C. for 2 minutes. At this time, the following atmospheres were employed for the aging heat treatment, each atmosphere for a different coil:

(1) gas consisting of $N_2$ by 100 vol %

(2) gas consisting of $N_2$ by 95 vol %+$O_2$ by 5 vol %

(3) gas consisting of $N_2$ by 91 vol %+$O_2$ by 9 vol %

(4) gas consisting of $N_2$ by 87 vol %+$O_2$ by 13 vol %

(5) gas consisting of $N_2$ by 79 vol %+$O_2$ by 21 vol %

The oxygen and nitrogen content in each steel [plate] *sheet* subjected to the cold rolling process were determined as follows:

(1) O: 28 ppm, N: 86 ppm (2) O: 26 ppm, N: 86 ppm (3) O: 27 ppm, N: 85 ppm (4) O: 25 ppm, N: 86 ppm (5) O: 27 ppm, N: 85 ppm None of the steel [plates] *sheets* exhibited an increase in nitrogen content (no nitriding took place), and no residual scale was observed.

Then, the steel [plates] *sheets* were decarburizing-annealed at 850° C. for 2 minutes in a continuous annealing furnace, the atmosphere consisting of 55 vol % $H_2$, the balance substantially consisting of $N_2$. The dew-point was 48° C. The weight of oxygen per unit area of the individual [plates] *sheets* was then measured, with the following results: (1) 1.18 g/m$^2$, (2) 1.22 g/m$^2$, (3) 1.25 g/m$^2$, (4) 1.48 g/m$^2$, and (5) 1.75 g/m$^2$. Thus, it was confirmed that oxidation of the steel [plates] *sheets* proceeded in proportion to the concentration of oxygen in the atmosphere in which the aging heat treatment was performed.

After the decarburizing annealing process had been performed, an annealing [separation agent] *separator*, consisting of $TiO_2$ and $Sr(OH)_2 \cdot 8H_2O$ added to MgO by 5 wt % and 3 wt % respectively, was applied to the surface of each of the steel [plates] *sheets*; each of the steel [plates] *sheets* was then divided into two sections in the lengthwise direction; and each of the sections was wound into the form of a coil. The temperature of *the* first of the divided coils in each pair was, in an atmosphere of $N_2$, maintained at 830° C. for 40 hours, then raised to 1200° C. at a rate of 12° C./hour in an atmosphere consisting of 25 vol % $N_2$ and 75 vol % $H_2$ ; and then final annealing was performed such that the temperature was maintained at 1200° C. for 10 hours in an atmosphere of $H_2$, after which the temperature was lowered. The second coil in each pair was maintained at a temperature of 830° C. for 40 hours in an atmosphere of $N_2$; the temperature was raised to 950° C. (just below the temperature where secondary recrystallization is initiated) at a temperature rising rate of 12° C./hour in an atmosphere of 25 vol % $N_2$ and 75 vol % $H_2$, after which the temperature was immediately lowered.

The first coil of each pair, having been subjected to the final annealing process, was also subjected to a process which removed non-reacted portions of the [separation agent] *separator*. Then, a sample was taken from the central portion of the first coil in the lengthwise direction of the same to measure the magnetic characteristics and the crystallization orientation angle $\alpha$. The second coil of each pair, which did not undergo secondary recrystallization, was also subjected to the process which removed non-reacted portions of the [separation agent] *separator*. A sample was then taken from the central portion of the coil in the lengthwise direction of the same; and the content of nitrogen was measured.

Figure 3:
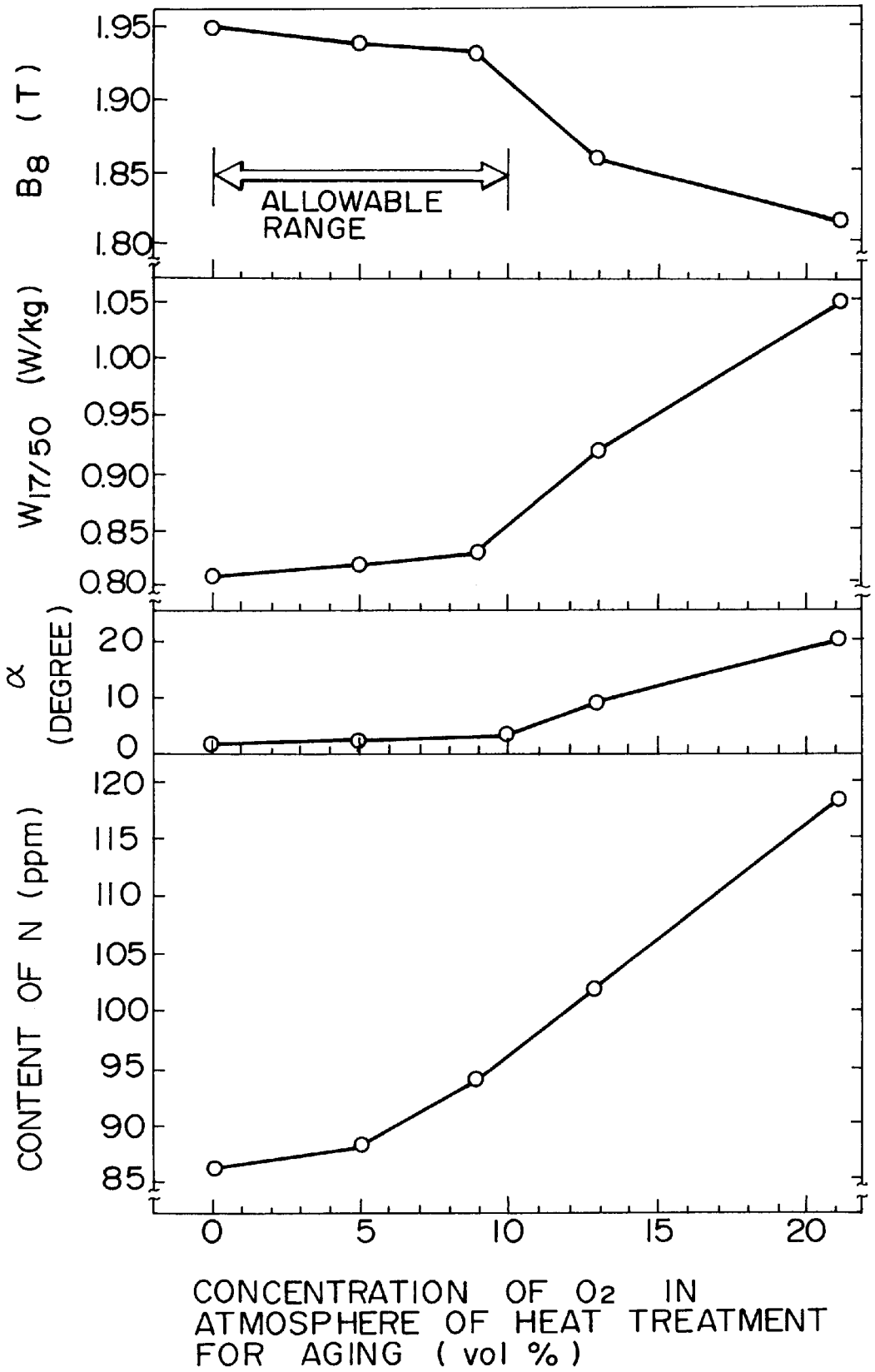
FIG. 3 is a graph showing influence of the concentration of $O_2$ in the atmosphere for the aging heat treatment upon the quantity of nitriding in the steel immediately before the secondary recrystallization, the deviation angle $\alpha$ of the secondarily recrystallized grains subjected to the final annealing process, and magnetic characteristics ($B_8$ and $W_{17/50}$) of the product steel.

Results with respect to the concentration of $O_2$ in the atmosphere for the aging heat treatment are collectively shown in FIG. 3.

As revealed in FIG. 3, if the content of oxygen in the atmosphere for the aging heat treatment is lower than 10 vol %, the deterioration in the magnetic characteristics occurring in the central portion of coils produced by conventional techniques can effectively be prevented.

Why an increase in the concentration of oxygen in the atmosphere for the aging heat treatment promotes nitriding of the steel [plate] *sheet* during the final annealing process will now be described.

When conventional heat effect treatments are performed before, during or after the rolling process, water and oxygen in liquids on the surface of the steel [plate] *sheet* (such as rolling oil or coolant oil) cause local oxidation to take place on the surface of the steel [plate] *sheet*. The local oxidation is exacerbated when the temperature of the steel [plate] *sheet* is raised.

The local oxidation results in non-uniform concentration of elements at the extreme upper surface of the steel [plate] *sheet*.

Consequently, non-uniform dispersion of oxide particles results in sub-scales being formed in the surface layers of the steel [plate] *sheet* in the subsequent decarburizing annealing process, whereby nitriding of the steel [plate] *sheet* proceeds locally during the final annealing process in the portions having relatively low concentrations of oxide particles.

Moreover, non-uniform dispersion of oxide particles takes place in the sub-scales formed on the surface layers of the steel [plate] *sheet* in any subsequent decarburizing annealing process, causing areas having relatively low concentrations of oxide particles to be generated locally, thereby allowing oxygen and nitrogen atoms to be easily diffused.

As a result, nitriding occurs in the final annealing process, thus resulting in deterioration of the steel [plate's] *sheet's* magnetic characteristics.

In such a steel [plate] *sheet*, low concentrations of oxide particles allows oxygen atoms to easily diffuse in the steel during the decarburizing annealing process. Thus, oxidation is promoted and the weight of oxygen per unit area of the surface of the steel [plate] *sheet* increases.

The foregoing discoveries have provided the basis for the present invention.

In the present invention, there are three types of heat effect treatments contemplated: one which is performed before the cold rolling process, another which is performed during the cold rolling process, and a third which is performed after the cold rolling process.

The heat effect treatment performed before the cold rolling process refers to a coil heating process performed before the coil is [cooled] *cold rolled*. This heat effect treatment is employed when the cold rolling process is performed in a warm condition.

The heat effect treatment performed during the cold rolling process refers particularly to either a "warm rolling" process for maintaining the steel temperature during the cold rolling process, an aging heat treatment performed between cold rolling passes, or a process for maintaining the temperature when the coil is wound between cold rolling passes.

The heat effect treatment to be performed after the cold rolling process refers to a process for maintaining the temperature at which the coil is wound after cold rolling has been performed.

The composition ranges for components of a steel slab to which the present invention can appropriately be applied will now be described.

C: about 0.01 wt % to 0.10 wt %

Carbon improves the hot-rolled structure such that secondary recrystallization is promoted. Therefore, the steel must contain at least about 0.01 wt % of carbon. If the steel contains more than about 0.10 wt % of carbon, the carbon cannot easily be removed by decarburizing annealing, thereby deteriorating the magnetic characteristics of the product steel. As a result, it is preferable that the carbon content be in a range from about 0.01 wt % to 0.10 wt %.

Si: about 2.0 wt % to 6.5 wt %

Silicon [strengthens] *increases* the electric resistance of the steel, which [prevents] *lowers* iron loss. Therefore, the steel must contain about 2.0 wt % or more silicon. If the silicon content is larger than about 6.5 wt %, the rolling process cannot easily be performed. Thus, it is preferable that the Si content be in a range from about 2.0 wt % to 6.5 wt %.

Mn: about 0.04 wt % to 2.0 wt %

Manganese prevents brittleness in the steel [plate] *sheet* when the hot rolling process is performed. To achieve this effect, the Mn content must be about 0.04 wt % or more. If the Mn content is larger than about 2.0 wt %, the decarburizing process cannot be performed smoothly. Therefore, it is preferable that Mn content be in a range from about 0.04 wt % to 2.0 wt %.

Al: about 0.01 wt % to 0.04 wt %

Aluminum, as a component of AlN, serves as an inhibitor to inhibit the growth of normal grains. If the Al content is less than about 0.01 wt %, the desired inhibition effect is not obtained. If the Al content is larger than about 0.04 wt %, [deposited]*precipitated* AlN is coarsely enlarged, thereby deteriorating the inhibition effect. Therefore, it is preferable that the Al content be in a range from about 0.01 wt % to 0.04 wt %.

N: about 0.003 wt % to 0.010 wt %

Nitrogen, like aluminum, is a component of AlN, and therefore must be contained in the steel in an amount of about 0.003 wt % or more. If the N content is larger than about 0.010 wt %, [deposited] *precipitated* AlN is coarsely enlarged and the inhibition effect deteriorates. Therefore, it is preferable that the N content be in a range from about 0.003 wt % to 0.010 wt %.

To enhance the inhibition effect, components S, Se, Sb, B, Sn, Cu, Bi, Te, Cr and Ni may also be added. To improve the inhibition effect, it is preferable that each of S, Se, Sb, Bi and Te be added in a range of about 0.005 wt % to 0.050 wt %, each of Sn, Cu, Cr and Ni be added in a range of about 0.03 wt % to 0.30 wt %, and B be added in a range of about 0.0003 wt % to 0.0020 wt %.

A manufacturing process illustrating the present invention will now be described. The description is not intended to limit the invention defined in the appended claims.

A steel slab having the above-described preferred composition range is subjected to a heating process to prepare the slab for hot rolling and for forming the inhibitor into a solid solution. Then, the steel slab is hot-rolled so that a hot-rolled coil is manufactured. The hot-rolled coil is, as the need arises, subjected to [a hot rolling] *an* annealing process, and then is cold rolled one [or two times] *stage or two stages* to a final thickness, the cold rolling including an intermediate annealing process. To improve the magnetic characteristics of the steel [plate] *sheet*, a warm rolling and an aging heat treatment are performed at this time.

The aging heat treatment performed between rolling passes includes a heat treatment of short duration using a continuous furnace; the aging is accomplished by using the sensible heat of the coil when the coil is wound after the rolling process has been performed. Another heat treatment is performed on the coil for an extended time in a BOX furnace. The concentration of oxygen in the atmosphere during the heat treatment is limited to about 10 % or lower.

A process for inhibiting local oxidation on the surface of the steel [plate] *sheet* according to the present invention is also performed. As a result, a grain-oriented silicon steel [plate] *sheet* is produced that exhibits excellent magnetic characteristics over the entire length of a coil thereof.

According to the present invention, there may be employed any of the following warm rolling methods: heating the coil before the coil is rolled; limiting the use of rolling oil used in lubricating the rolls and for cooling the coil such that heat generated during the rolling operation is used in a warm rolling process; and a method combining the foregoing two methods. The rolling machine may be a [reverse-type machine] *reverse mill*, such as a Sendzimer mill, or a [continuous-type machine] *continuous mill*, such as a [tandem-type] *tandem* mill.

According to the present invention, the concentration of oxygen is limited to about 10 vol % or lower in any of the atmospheres in which the coil is heated before the coil is rolled, in which the coil is wound and retained between rolling passes, or in which the coil is wound and retained after the coil has been rolled. As a result, a grain-oriented silicon steel [plate] *sheet* can be obtained that exhibits excellent magnetic characteristics over the entire length of a coil thereof.

If the concentration of oxygen in the atmosphere used in the heat effect treatment is higher than about 10 vol %, the surface of the rolled steel [plate] *sheet* is easily oxidized and nitrided. Consequently, nitriding proceeds during the final annealing process, thereby deteriorating the magnetic characteristics of the coil except at either end of the coil. Thus, it is important to limit the concentration of oxygen in the heat effect treatment atmosphere to about 10 vol % or lower.

As for components other than oxygen in heat effect treatment atmospheres, it is preferable that a neutral atmosphere of $N_2$ or Ar be employed. However, a reducing atmosphere comprising a mixture of $H_2$, CO or $CO_2$ is also permitted.

After cold rolling, the coil of the present invention is subjected to a conventional decarburizing annealing process, followed by the application of an annealing [separation agent] *separator*. The coil is then subjected to the final annealing process, including the secondary recrystallization and annealing for purification. After the final annealing process has been completed, non-reacted portions of the [separation agent] *separator* are removed, followed by an application of an[.] insulating coating, as the need arises. Finally, the steel is subjected to a flattening heat treatment.

A means according to the present invention for inhibiting the local oxidation of the surface of the steel [plate] *sheet* involves performing at least one oxidation inhibiting process pass as part of the rolling passes for the cold rolling process. The oxidation inhibiting process pass reduces the liquid existing on the surface of the steel [plate] *sheet* and is performed in a *downstream* region ranging from the *roll bite* outlet of the rolling process to the position at which the steel [plate] *sheet* is wound.

As a result of the foregoing oxidation inhibiting process, the quantity of the water screen existing on the surface of the steel [plate] *sheet* is reduced, as well as the total quantity of dissolved oxygen existing in water. Therefore, local oxidation of the steel [plate] *sheet* is effectively inhibited. As a matter of course, it is preferable that the foregoing oxidation inhibiting process be performed in every rolling pass.

Another means for inhibiting the local oxidation of the steel [plate] *sheet* is to cause an oxidation inhibiting agent to be contained in liquid existing on the surface of the steel [plate] *sheet*.

This can be accomplished by adding the oxidation inhibiting agent to the rolling oil, the roll coolant oil and/or the strip coolant oil used in the cold rolling process.

Examples of oxidation inhibiting agents include aliphatic amine of tallow, sorbitan mono-oleate, ester of succinic acid and the like. Other inhibiting agents may also be employed.

Although any of the above-described means for inhibiting local oxidation on the surface of the steel [plate] *sheet* provides a satisfactory effect, employment of two or more means can enhance the effect obtained.

After the steel [plate] *sheet* has been rolled to a final thickness by the above-described cold rolling process, a conventional decarburizing annealing process is performed, followed by the application of an annealing [separation agent] *separator* to the steel [plate] *sheet*. Then, the steel sheet is subjected to a final annealing process in which secondary recrystallization and annealing for purification are performed.

After the final annealing process has been performed, non-reacted portions of the separator are removed, and thereafter an insulating coating material is applied. Finally, a flattening heat treatment is performed, if needed.

It is also understood that a magnetic domain refining process, such as irradiation with laser beams or plasma irradiation, may be performed.

Other and further objectives, features and advantages of the invention will become apparent from the following description.

EXAMPLES

The invention will now be described through illustrative examples. The examples are not intended to limit the invention defined in the appended claims.

EXAMPLE 1

A steel slab, containing C by 0.07 wt %, Si by 3.25 wt %, Mn by 0.07 wt %, S by 0.004 wt %, Al by 0.028 wt %, Sb by 0.028 wt % and N by 0.007 wt % and the balance substantially consisting of Fe, was heated to 1250° C, then hot rolled to produce a hot-rolled steel sheet having a thickness of 1.8 mm. Then, the steel sheet was subjected to an annealing at 1150° C. for one minute, followed by a pickling. The steel sheet was divided into two coils, and each coil was cold rolled with six passes by a Sendzimir mill so that it had a final thickness of 0.20 mm. At this time, the first coil was subjected to a warm rolling process in which the quantity of the rolling oil was limited so as to raise the temperature of the rolled steel sheet after the second pass from 150° C. to 220° C.

The second coil was subjected to a process which maintained the temperature at which the coil was wound after the cold rolling process had been performed. This process involved surrounding the winding apparatus with a box-type structure into which $N_2$ gas was injected so that the concentration of oxygen in the atmosphere was limited to between 1 vol % to 5 vol %.

The second coil was wound according to a conventional technique in ambient atmosphere.

Then, both of the coils were degreased and subjected to the decarburizing annealing process at 850° C. for 2 minutes in an atmosphere of 40 vol % $H_2$, the dew point of the atmosphere being 50° C. Then, MgO containing $TiO_2$ by 5 wt % and $Sr(OH)_2 \cdot 8H_2O$ by 3 wt % was, as an annealing separator, applied to the coils, after which the coils were wound into coil form. Then, the coils were subjected to the final annealing process.

The final annealing process was performed such that the temperature of the coils were maintained at 850° C. for 15 hours in an atmosphere of $N_2$, after which the temperature was raised to 1200° C. at a rate of 15° C./hour in an atmosphere of 25 vol % $N_2$ and 75 vol % $H_2$. Then, the temperature was maintained at 1200° C. for 5 hours in an atmosphere of $H_2$.

After the final annealing process had been performed, non-reacted portions of the separator were removed from each of the coils, and then tension coating liquid containing magnesium phosphate and colloidal silica was applied. Thereafter, a flattening annealing process which also baked the coating material was performed at 800° C. for 1 minute.

Results of the magnetic characteristic evaluations of the leading portion, the central portion and the tailing end of each coil are shown in Table 1.

TABLE 1

| | EXAMPLE OF THIS INVENTION | | COMPARATIVE EXAMPLE | |
|---|---|---|---|---|
| | CONCENTRATION OF OXYGEN WHEN COIL IS WOUND | | | |
| | 1–5 vol % | | 21 vol % | |
| MAGNETIC CHARACTERISTICS | | | | |
| POSITION IN THE COIL | Bg (T) | $W_{17/50}$ (W/kg) | Bg (T) | $W_{17/50}$ (W/kg) |
| LEADING END | 1.932 | 0.783 | 1.924 | 0.824 |
| CENTRAL PORTION | 1.935 | 0.764 | 1.846 | 1.093 |
| TAILING END | 1.933 | 0.775 | 1.928 | 0.816 |

As shown in Table 1, the conventional coil exhibited deterioration in the magnetic characteristics in the central portion thereof, whereas no such deterioration occurred in the coil according to the present invention.

EXAMPLE 2

A steel slab, containing C by 0.078 wt %, Si by 3.35 wt %, Mn by 0.07 wt %, S by 0.007 wt %, Al by 0.028 wt %, Se by 0.020 wt %, Sb by 0.025 wt % and N by 0.007 wt %, with the balance substantially consisting of Fe, was heated to 1420° C., then hot rolled to form a hot-rolled steel sheet having a thickness of 2.2 mm. Then, the steel sheet was subjected to an annealing process at 1000° C. for 50 seconds, followed by a pickling and a first cold-rolling process to achieve an intermediate thickness of 1.5 mm. Then, the coil was subjected to intermediate annealing at 1150° C. for one minute, followed by a pickling. The coil was then divided into two sections.

The formed coils were subjected to a second cold rolling process so that each of the coils had a final thickness of 0.22 mm. At the point in the second cold-rolling process where the coil thickness was 0.75 mm, the coils were subjected to an aging heat treatment at 200° C. for one hour. The heat treatment for aging was performed such that the concentration of oxygen in the atmosphere in the heating BOX furnace for one coil was lowered to between 0.01 wt % and 0.5 wt % by injecting Ar. Conversely, the other coil was inserted into a BOX furnace having an ambient atmosphere, as is done in conventional techniques.

Thereafter, both of the coils were degreased and subjected to decarburizing annealing at 850° C. for 2 minutes in an atmosphere of 60 vol % $H_2$ with the balance substantially consisting of $N_2$, the dew point of the atmosphere being 55° C. Then, MgO containing $TiO_2$ by 8 wt % and $SrSO_4$ by 3 wt % was, as an annealing separator, applied to the coils, and thereafter the coils were wound into coil form. Then, the formed coils were subjected to a final annealing process.

The final annealing process was performed such that the temperature of each coil was maintained at 840° C. for 40 hours in an atmosphere of $N_2$, and then the temperature was raised to 1200° C. at a rate of 15° C./hour in an atmosphere consisting of 25 vol % $N_2$ and 75 vol % of $H_2$. Then, the temperature was maintained at 1200° C. for 5 hours in an atmosphere of $H_2$.

After the final annealing process had been completed, non-reacted portions of the separator were removed from the two coils, and tension coating liquid containing magnesium phosphate and colloidal silica was applied. Then, a flattening annealing process, which also baked the coated material, was performed at 800° C. for one minute.

Results of the magnetic characteristic evaluations of the leading portion, the central portion and the tailing end of each coil are shown in Table 2.

TABLE 2

| | EXAMPLE OF THIS INVENTION | | COMPARATIVE EXAMPLE | |
|---|---|---|---|---|
| | CONCENTRATION OF OXYGEN IN THE ATMOSPHERE FOR HEAT TREATMENT FOR AGING | | | |
| | 0.01–0.5 vol % | | 21 vol % | |
| | MAGNETIC CHARACTERISTICS | | | |
| POSITION IN THE COIL | Bg (T) | $W_{17/50}$ (W/kg) | Bg (T) | $W_{17/50}$ (W/kg) |
| LEADING END | 1.938 | 0.803 | 1.932 | 0.825 |
| CENTRAL PORTION | 1.942 | 0.795 | 1.840 | 1.124 |
| TAILING END | 1.940 | 0.801 | 1.919 | 0.843 |

As is shown in Table 2, the conventional coil exhibited deterioration in the magnetic characteristics in the central portion thereof, whereas no such deterioration occurred in the coil according to the present invention.

EXAMPLE 3

A steel slab, containing C by 0.075 wt %, Si by 3.26 wt %, Mn by 0.08 wt %, S by 0.016 wt %, Al by 0.022 wt %, and N by 0.008 wt %, with the balance substantially consisting of Fe, was heated to 1380° C., followed by a hot rolling to produce a hot-rolled steel sheet having a thickness of 2.2 mm. Then, the steel sheet was subjected to an annealing process at 1150° C. for 50 seconds, followed by a pickling. The coil was then divided into two sections, and the two coils were rolled by tandem rolling mill to a final thickness of 0.35 mm. Prior to the tandem rolling, the two coils were heated to 250° C., and the quantity of the coolant was adjusted so as to raise the temperature of the steel sheet during the tandem rolling from 150° C. to 200° C.

One of the coils was subjected to a heat effect treatment wherein the coil was heated before tandem rolling. At this time, $N_2$ was injected into the BOX furnace so that the concentration of oxygen ranged between 0.05 vol % and 0.6 vol %. The other coil was also subjected to a heat effect treatment wherein the coil was heated before tandem rolling, but the heating was performed in a BOX furnace having an ambient atmosphere in accordance with conventional techniques.

Then, both of the coils were degreased and subjected to decarburizing annealing at 840° C. for 2 minutes in a atmosphere of 50 vol % $H_2$ with the balance substantially consisting of $N_2$, the dew point of the atmosphere being 50° C.; Then, MgO containing $TiO_2$ by 10 wt % and $Sr(OH)_2 \cdot 8H_2O$ by 3 wt % was, as an annealing separator, applied to the coils, followed by winding the coils into coil form. Then, the formed coils were subjected to a final annealing process.

The final annealing process was performed such that the temperature was raised to 850° C. at a rate of 20° C./hour in an atmosphere of $N_2$. Then, the temperature was raised to 1200° C. at a rate of 15° C./hour in an atmosphere consisting of 25 vol % $N_2$ and 75 vol % $H_2$, followed by maintaining the coils at 1200° C. for 5 hours in an atmosphere of $H_2$.

After the final annealing process had been completed, non-reacted portions of the separator were removed from the two coils, and tension coating liquid containing aluminum phosphate and colloidal silica was applied. Then, a flattening annealing process, which also baked the coated material, was performed at 800° C. for one hour.

Results of the magnetic characteristic evaluations of the leading portion, the central portion and the tailing end of each coil are shown in Table 3.

TABLE 3

| | EXAMPLE OF THIS INVENTION | | COMPARATIVE EXAMPLE | |
|---|---|---|---|---|
| | CONCENTRATION OF OXYGEN IN THE ATMOSPHERE FOR HEAT TREATMENT FOR AGING | | | |
| | 0.05–0.6 vol % | | 21 vol % | |
| | MAGNETIC CHARACTERISTICS | | | |
| POSITION IN THE COIL | Bg (T) | $W_{17/50}$ (W/kg) | Bg (T) | $W_{17/50}$ (W/kg) |
| LEADING END | 1.935 | 1.123 | 1.930 | 1.153 |
| CENTRAL PORTION | 1.938 | 1.105 | 1.893 | 1.287 |
| TAILING END | 1.933 | 1.117 | 1.931 | 1.146 |

As shown in Table 3, the conventional coil exhibited magnetic characteristic deterioration in the central portion thereof, whereas no such deterioration occurred in the coil produced according to the present invention.

EXAMPLE 4

Steel slabs having the variety of compositions shown in Table 4 were heated to 1410° C., and then hot rolled to produce a hot-rolled steel sheet having a thickness of 2.0 mm. Then, the steel sheet was pickled, and the surface scales were removed, followed by a first cold rolling to produce a steel sheet having an intermediate thickness of 1.50 mm. Then, the steel sheet was subjected to an intermediate annealing process at 1100° C. for 50 seconds, and then water mist was used to rapidly cool the steel sheet to 350° C. at a cooling rate of 40° C./second. The temperature of the steel sheet was maintained at 350° C. for 20 seconds, the temperature thereafter being lowered with water. Then, the surface of the steel sheet was ground so that a portion of the surface scales was removed, with the sheet then being cold rolled by a Sendzimir mill with six passes to produce a final thickness of 0.22 mm.

At this time, a warm rolling process was performed in which the quantity of rolling oil was limited so as to raise the temperature of the steel sheet from 150° C. to 180° C. after the second pass.

After the cold rolling had been performed, the steel was subjected to a process for maintaining the temperature at which the coil was wound. To achieve this, the apparatus for winding the coil was surrounded by a box-type structure, and Ar gas was injected so as to limit the concentration of oxygen in the atmosphere to between 1% and 3 %.

Then, the coil was degreased and subjected to decarburizing annealing at 850° C. for 2 minutes in a atmosphere of 60 vol % $H_2$ with the balance substantially consisting of $N_2$, the dew point of the atmosphere being 45° C. Then, MgO containing $TiO_2$ by 5 wt % and $Sr(OH)_2 \cdot 8H_2O$ by 3 wt % was, as an annealing separator, applied to the coil. The coil was then wound into coil form and subjected to a final annealing process.

The final annealing process involved maintaining the temperature at 850° C. for 20 hours, and then raising the temperature to 1200° C. at a rate of 15° C./hour in an atmosphere consisting of 25 vol % $N_2$ and 75 vol % $H_2$, followed by maintaining the coil at 1200° C. for 5 hours in an atmosphere of $H_2$.

After the final annealing process had been completed, non-reacted portions of the separator were removed from the coil, and tension coating liquid containing magnesium phosphate and colloidal silica was applied. Then, a flattening annealing process, which also baked the coated material, was performed at 800° C. for one hour.

Results of the magnetic characteristic evaluations at the leading portion, the central portion and the tailing end of each coil are shown in Table 5.

TABLE 4

Unit of *: ppm

| STEEL | COMPOSITION OF ELEMENTS (wt %) | | | | | | | | | | | | | | | | |
|---|---|---|---|---|---|---|---|---|---|---|---|---|---|---|---|---|---|
| No. | C | Si | Mn | P | S | Al | Se | Cu | Ni | Cr | Sn | Mo | Sb | Bi | Te | B* | N* |
| A | 0.07 | 3.34 | 0.075 | 0.008 | 0.016 | 0.026 | tr | 0.01 | 0.01 | 0.01 | 0.02 | tr | tr | tr | tr | 3 | 82 |
| B | 0.08 | 3.30 | 0.073 | 0.005 | 0.003 | 0.025 | 0.018 | 0.01 | 0.01 | 0.01 | 0.01 | tr | tr | tr | tr | 3 | 78 |
| C | 0.06 | 3.36 | 0.072 | 0.007 | 0.015 | 0.025 | tr | 0.01 | 0.02 | 0.01 | 0.01 | tr | 0.025 | tr | tr | 3 | 69 |
| D | 0.07 | 3.38 | 0.075 | 0.012 | 0.004 | 0.027 | 0.020 | 0.02 | 0.01 | 0.02 | 0.01 | tr | 0.022 | tr | tr | 4 | 73 |
| E | 0.07 | 3.30 | 0.073 | 0.006 | 0.003 | 0.026 | 0.020 | 0.01 | 0.05 | 0.01 | 0.02 | tr | 0.025 | tr | tr | 2 | 78 |
| F | 0.08 | 3.32 | 0.074 | 0.008 | 0.016 | 0.027 | tr | 0.08 | 0.01 | 0.01 | 0.02 | tr | 0.025 | tr | tr | 3 | 79 |
| G | 0.06 | 3.30 | 0.076 | 0.015 | 0.018 | 0.026 | tr | 0.02 | 0.08 | 0.01 | 0.15 | tr | 0.020 | tr | tr | 3 | 85 |
| H | 0.07 | 3.35 | 0.068 | 0.008 | 0.018 | 0.026 | tr | 0.01 | 0.02 | 0.01 | 0.02 | tr | 0.018 | 0.008 | tr | 4 | 83 |
| I | 0.08 | 3.30 | 0.080 | 0.003 | 0.004 | 0.027 | 0.016 | 0.02 | 0.01 | 0.01 | 0.01 | 0.12 | 0.025 | 0.005 | tr | 4 | 88 |
| J | 0.08 | 3.38 | 0.088 | 0.009 | 0.005 | 0.024 | 0.018 | 0.01 | 0.01 | 0.02 | 0.02 | 0.08 | 0.022 | tr | 0.005 | 4 | 82 |
| K | 0.07 | 3.39 | 0.075 | 0.012 | 0.003 | 0.023 | 0.020 | 0.01 | 0.01 | 0.01 | 0.02 | tr | tr | tr | tr | 12 | 65 |
| L | 0.08 | 3.35 | 0.073 | 0.008 | 0.004 | 0.026 | 0.021 | 0.01 | 0.02 | 0.10 | 0.02 | tr | tr | 0.012 | tr | 3 | 75 |
| M | 0.07 | 3.30 | 0.075 | 0.058 | 0.004 | 0.025 | 0.021 | 0.01 | 0.02 | 0.01 | 0.10 | tr | tr | tr | tr | 4 | 79 |
| N | 0.07 | 3.34 | 0.077 | 0.058 | 0.004 | 0.025 | 0.020 | 0.01 | 0.01 | 0.02 | 0.01 | tr | 0.025 | 0.015 | tr | 4 | 83 |
| O | 0.07 | 3.36 | 0.069 | 0.008 | 0.004 | 0.027 | 0.021 | 0.07 | 0.01 | 0.02 | 0.02 | tr | 0.025 | tr | tr | 3 | 80 |
| P | 0.07 | 3.38 | 0.076 | 0.005 | 0.001 | 0.028 | 0.018 | 0.08 | 0.01 | 0.02 | 0.01 | tr | 0.025 | tr | tr | 4 | 75 |

TABLE 5

| | POSITION IN THE COIL | | | | | |
|---|---|---|---|---|---|---|
| | LEADING END | | CENTRAL PORTION | | TAILING END | |
| STEEL No. | Bg (T) | $W_{17/50}$ (W/kg) | Bg (T) | $W_{17/50}$ (W/kg) | Bg (T) | $W_{17/50}$ (W/kg) |
| A | 1.926 | 0.846 | 1.923 | 0.848 | 1.925 | 0.849 |
| B | 1.924 | 0.839 | 1.922 | 0.845 | 1.924 | 0.846 |
| C | 1.938 | 0.790 | 1.936 | 0.810 | 1.938 | 0.803 |
| D | 1.936 | 0.793 | 1.937 | 0.798 | 1.937 | 0.806 |
| E | 1.935 | 0.801 | 1.936 | 0.803 | 1.934 | 0.806 |
| F | 1.937 | 0.798 | 1.938 | 0.798 | 1.937 | 0.797 |
| G | 1.938 | 0.802 | 1.936 | 0.803 | 1.937 | 0.804 |
| H | 1.937 | 0.797 | 1.935 | 0.795 | 1.936 | 0.796 |
| I | 1.939 | 0.797 | 1.938 | 0.796 | 1.936 | 0.798 |
| J | 1.936 | 0.800 | 1.935 | 0.802 | 1.934 | 0.803 |
| K | 1.924 | 0.829 | 1.925 | 0.843 | 1.927 | 0.844 |
| L | 1.926 | 0.817 | 1.927 | 0.821 | 1.925 | 0.826 |
| M | 1.923 | 0.823 | 1.924 | 0.826 | 1.926 | 0.820 |
| N | 1.937 | 0.804 | 1.936 | 0.802 | 1.934 | 0.803 |
| O | 1.938 | 0.800 | 1.935 | 0.792 | 1.937 | 0.798 |
| P | 1.936 | 0.795 | 1.937 | 0.792 | 1.939 | 0.792 |

EXAMPLE 5

A steel slab having composition D shown in Table 4 was heated to 1400° C., then hot rolled to produce a hot-rolled steel sheet having a thickness of 1.8 mm. Then, the steel sheet was subjected to an annealing process at 1000° C. for one minute, followed by a pickling. The steel sheet was then rolled by tandem rolling mill to a thickness of 1.3 mm, after which the sheet was divided into coils R and S.

Coil R was treated in accordance with the present invention, while coil S was, as a comparative example, treated according to conventional processes.

Coil R was heated to 200° C. in a furnace, into which an atmosphere of $N_2$ had been introduced, and then warm-rolled at temperature of 180° C. Coil S was heated to 200° C. in a furnace having an ambient atmosphere, followed by rolling at a temperature of 180° C. Then, the two coils were intermediate-annealed at 1100° C. for one minute, after which the temperature was rapidly lowered to 350° C. at a rate of 40° C./second. The coils were then gradually cooled at a rate of 1.0° C./second, and thereafter cooled with water. Then, a portion of the surface scales were removed, and the coils were cold rolled by a Sendzimir mill with 5 passes so that the coils had a final thickness of 0.18 mm. At this time, the quantity of the rolling oil was limited so as to raise the temperature of the steel after the second stand from 150° C. to 180° C. Then, the coils were wound such that the apparatus for winding coil R was surrounded by a box-type structure, and $N_2$ gas was injected to limit the concentration of oxygen in the atmosphere from 0.5 vol % to 2 vol %, all while maintaining a constant coiling temperature.

As for the coil S, the coil winding apparatus was surrounded by a box-type structure, but an ambient atmosphere was maintained.

Then, the coil was degreased and subjected to a decarburizing annealing process at 850° C. for 2 minutes in an atmosphere consisting of 50 vol % $H_2$with the balance substantially consisting of $N_2$, the dew point of the atmosphere being 50° C. Then, MgO containing $TiO_2$ by 5 wt % and $SrSO_4$ by 3 wt % was, as an annealing separator, applied, after which the coils were formed and subjected to a final annealing process.

The final annealing process was performed such that the temperature was maintained at 840° C. for 25 hours, and then raised to 1200° C. at a rate of 15° C./hour in an atmosphere consisting of 25 vol % $N_2$ and 75 vol % $H_2$, followed by maintaining the coil at 1200° C. for 5 hours in an atmosphere of $H_2$.

After the final annealing process had been completed, non-reacted portions of the separator were removed from the two coils, and tension coating liquid containing magnesium phosphate and colloidal silica was applied. Then, a flattening annealing process, which also baked the coated material, was performed at 800° C. for one hour.

Results of the magnetic characteristic evaluations of the leading portion, the central portion and the tailing end of each coil are shown in Table 6.

TABLE 6

| | LEADING END | | CENTRAL PORTION | | TAILING END | |
|---|---|---|---|---|---|---|
| COILS | $B_g$ (T) | $W_{17/50}$ (W/kg) | $B_g$ (T) | $W_{17/50}$ (W/kg) | $B_g$ (T) | $W_{17/50}$ (W/kg) |
| EXAMPLE (COIL R) | 1.922 | 0.738 | 1.924 | 0.722 | 1.923 | 0.735 |
| COMPARATIVE EXAMPLE (COIL S) | 1.916 | 0.765 | 1.846 | 0.985 | 1.918 | 0.773 |

As shown in Table 6, the coil according to the present invention was free from magnetic characteristic deterioration in the central portion of the coil. However, the coil produced as a Comparative example exhibited magnetic characteristic deterioration in the central portion thereof.

EXAMPLE 6

A grain-oriented silicon steel sheet slab, consisting of C by 0.075 wt %, Si by 3.35 wt %, Mn by 0.07 wt %, S by 0.003 wt %, P by 0.003 wt %, Al by 0.025 wt %, Se by 0.020 wt %, Sb by 0.025 wt % and N by 0.008 wt % and the balance substantially consisting of Fe, was heated to 1410° C., then hot rolled to produce a hot-rolled steel sheet having a thickness of 2.2 mm. The hot-rolled coil was annealed in an atmosphere in which town gas was burnt at 1150° C. for 40 seconds, and then mist water was sprayed to rapidly cool the coil to 70° C. at a cooling rate of 30° C./second. Then, the coil was pickled in a water solution of HCl.

Then, the coil was divided into coils a, b, c, d and e, each coil being rolled with six passes by a Sendzimir mill. The rolls of the mill were 80 mm in diameter, and had a temperature of 100° C. to 230° C. The coils had a final thickness of 0.26 mm.

Divided coil a was wound at the following temperatures: 80° C. for the first pass, 124° C. for the second pass, 179° C. for the third pass, 216° C. for the fourth pass, 220° C. for the fifth pass, and116° C. for the sixth pass. Immediately before winding at the second, third and fourth passes. $N_2$ gas was sprayed across the upper and lower surfaces of the steel sheet to remove liquid on the surfaces of the steel sheet by a gas-knife effect.

Divided coil b was wound at the following temperatures: 83° C. for the first pass, 120° C. for the second pass, 193° C. for the third pass, 212° C. for the fourth pass, 218° C. for the fifth pass, and 107° C. for the sixth pass. Immediately before winding at the fourth, fifth and sixth passes, $N_2$ gas was sprayed on the upper and lower surfaces of the steel sheet to remove liquid on the surfaces of the steel sheet by a gas-knife effect.

Divided coil c was wound at the following temperatures: 73° C. for the first pass, 122° C. for the second pass, 188° C. for the third pass, 216° C. for the fourth pass, 212° C. for the fifth pass, and 113° C. for the sixth pass. Immediately before winding at the fifth and sixth passes, suction rolls were used to remove liquid on the surfaces of the steel sheet.

Divided coil d was wound at the following temperatures: 84° C. for the first pass, 136° C. for the second pass, 192° C. for the third pass, 209° C. for the fourth pass, 216° C. for the fifth pass, and 121° C. for the sixth pass. Immediately before winding at the sixth pass, suction rolls were used to remove liquid on the surface of the steel sheet.

Divided coils a, b, c and d are examples of the present invention.

Divided coil e was wound at the following temperatures: 86° C. for the first pass, 125° C. for the second pass, 185° C. for the third pass, 224° C. for the fourth pass, 208° C. for the fifth pass, and 122° C. for the sixth pass. No measures for removing liquid from the surfaces of the steel sheet were undertaken.

Divided coils a, b, c, d and e were all degreased after being rolled, and subjected to a decarburizing annealing process at 840° C. for 2 minutes in an atmosphere of 50 vol % $H_2$ with the balance substantially consisting of $N_2$, the dew-point of the atmosphere being 48° C. Then, MgO containing $TiO_2$ by 8 wt % was, as an annealing separator, applied, after which the coils were formed and subjected to a final annealing process.

The final annealing process was performed such that the coils were maintained at 850° C. for 15 hours in an atmosphere of $N_2$, and thereafter the temperature was raised to 1200° C. at a temperature rising rate of 15° C./hour in an atmosphere consisting of 15 vol % $N_2$ and 85 vol % $H_2$. Then, the temperature was maintained at 1200° C. for 5 hours in an atmosphere of $H_2$, after which the temperature was lowered.

Non-reacted portions of the separator were removed, and a tension coating material was applied. The steel was then subjected to a flattening process at 800° C. for one minute.

Figure 4:
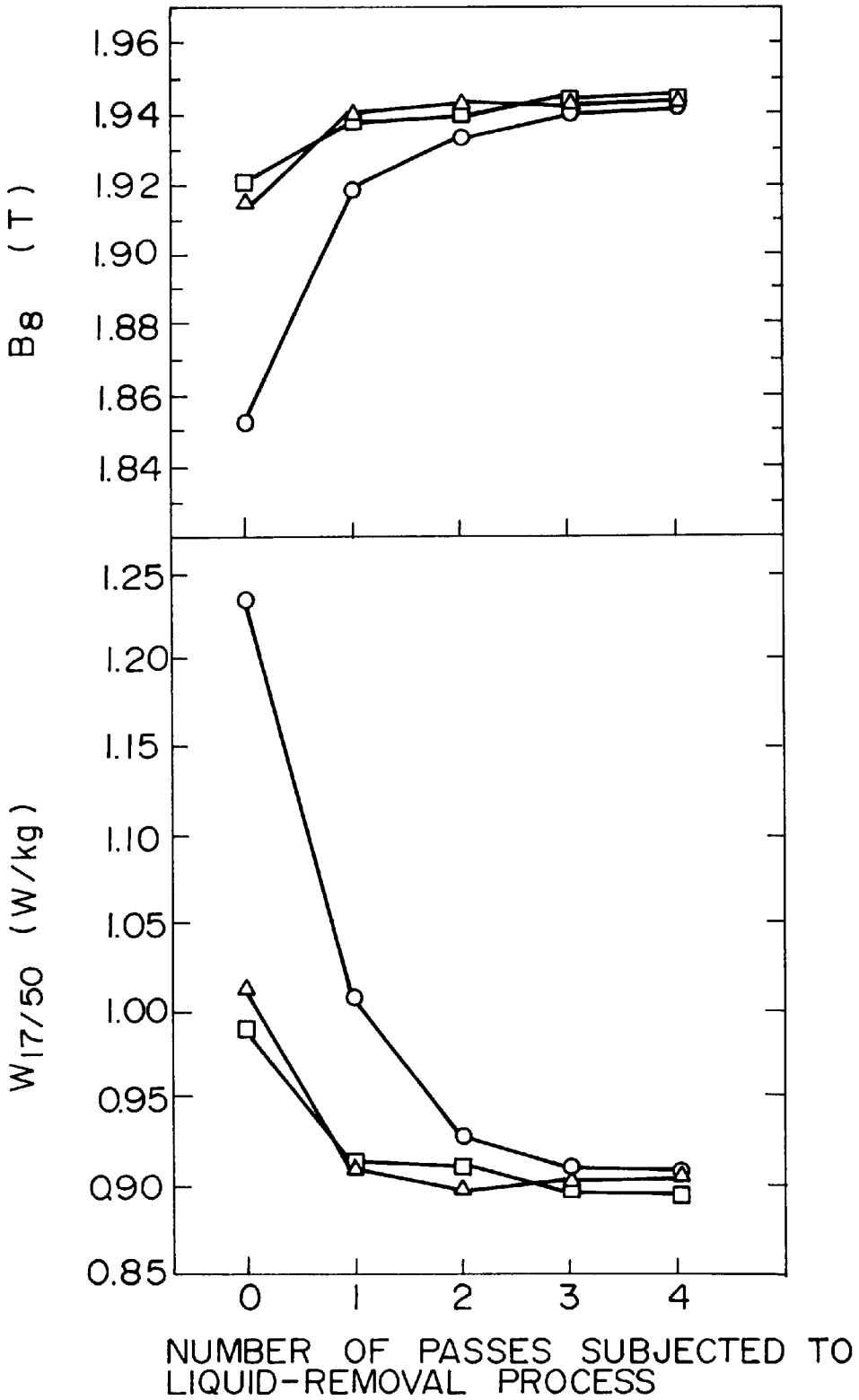
FIG. 4 is a graph showing influence of 0 to 4 cold rolling passes in which a liquid removal process according to the invention have been performed upon the magnetic characteristics ($B_8$ and $W_{17/50}$) of the product steel.

Results of the magnetic characteristic evaluations of the leading portion, the central portion and the tailing end of each coil are shown in Table 7 and FIG. 4.

As shown in Table 7, the conventional example (coil e) exhibited magnetic characteristic deterioration in the central portion thereof, whereas the coil according to the present invention was free from any such deterioration.

As can be understood from FIG. 4, an excellent effect was obtained even if the liquid removal process was performed only on one pass.

oil was limited so as to raise the temperature of the steel after the second pass from 150° C. to 230° C.

Each of the coils was divided into two sections, one of the coils of each pair being rolled using conventional rolling oil. On the other hand, the other coil of each pair was rolled using rolling oil to which was added an ester of succinic acid by 2 wt % as an oxidation inhibitor for the steel sheet.

Each coil was then degreased and subjected to a decarburizing annealing process at 850° C. for two minutes in an atmosphere consisting of 60 vol % $H_2$ with the balance substantially consisting of $N_2$, the dew-point of the atmosphere being 45° C. Then, MgO containing $TiO_2$ by 5 wt % and $Sr(OH)_2 \cdot SH_2O$ by 3 wt % was applied as an annealing separator, and then coils were formed and subjected to a final annealing process.

The final annealing process was performed such that the coils were maintained at 850° C. for 20 hours, then the

TABLE 7

| SAMPLE | NUMBER OF PASSES SUBJECTED LIQUID REMOVAL PROCESS | POSITION IN THE COIL | MAGNETIC CHARACTERISTICS Bg (T) | $W_{17/50}$ (W/kg) | REMARKS |
|---|---|---|---|---|---|
| a | 4 | Leading end | 1.943 | 0.908 | Example of this |
| | | Central portion | 1.942 | 0.910 | invention |
| | | Tailing end | 1.944 | 0.896 | |
| b | 3 | Leading end | 1.943 | 0.905 | Example of this |
| | | Central portion | 1.940 | 0.911 | invention |
| | | Tailing end | 1.944 | 0.898 | |
| c | 2 | Leading end | 1.943 | 0.901 | Example of this |
| | | Central portion | 1.934 | 0.928 | invention |
| | | Tailing end | 1.940 | 0.912 | |
| d | 1 | Leading end | 1.940 | 0.912 | Example of this |
| | | Central protion | 1.918 | 1.007 | invention |
| | | Tailing end | 1.938 | 0.915 | |
| e | 0 | Leading end | 1.914 | 1.014 | Comparative example |
| | | Central portion | 1.852 | 1.235 | |
| | | Tailing end | 1.920 | 0.988 | |

EXAMPLE 7

Four steel slabs respectively having the compositions A to D shown in Table 4 were heated to 1420° C., then hot rolled to produce hot-rolled steel sheets each having a thickness of 2.0 mm. The steel sheets were pickled, surface scales removed, and then a first cold rolling process were performed so that each of the steel sheets had an intermediate thickness of 1.50 mm. Thereafter, an intermediate annealing process was performed at 1100° C. for 50 seconds, and mist water was applied, thus lowering the steel temperature to 350° C. at a rate of 40° C./second. Then, the temperature was maintained at 350° C. for 20 seconds, after which the steel sheets were cooled by immersing them in 90° C. hot water. The steel sheets were then immediately pickled with an acid in a 80° C.-water-solution of 15 wt % HCl so that a major portion of the scales were removed.

Then, the steel sheets were rolled with six passes by a Sendzimir mill so that each of the steel sheets had a final thickness of 0.22 mm. At this time, the quantity of the rolling temperature was raised to 1200° C. at a rate of 15° C./hour in an atmosphere consisting of 25 vol % $N_2$ and 75 vol % Then, the temperature was maintained at 1200° C. for 5 hours in an atmosphere of $H_2$.

After the final annealing process was completed, non-reacted portions of the separator were removed, and tension coating liquid containing magnesium phosphate and colloidal silica was applied. The coils were then subjected to a flattening annealing process, which also baked the coating liquid, at 800° C. for one hour.

Results of the magnetic characteristic evaluations of the leading portion, the central portion and the tailing end of each coil are shown in Table 8.

As is shown in Table 8, the comparative examples exhibited magnetic characteristic deterioration in the central portion of the coils. Conversely, the examples of the present invention showed no such deterioration.

TABLE 8

| SAMPLE | ADDITION OF OXIDATION INHIBITOR | POSITION IN THE COIL | MAGNETIC CHARACTERISTICS Bg (T) | $W_{17/50}$ (W/kg) | REMARKS |
|---|---|---|---|---|---|
| A | Not added | Leading end | 1.918 | 0.903 | Comparative example |
| | | Central portion | 1.867 | 0.978 | Comparative example |
| | | Tailing end | 1.917 | 0.905 | Comparative example |
| | Added | Leading end | 1.925 | 0.847 | Example of this invention |
| | | Central portion | 1.923 | 0.850 | Example of this invention |
| | | Tailing end | 1.924 | 0.848 | Example of this invention |
| B | Not added | Leading end | 1.914 | 0.924 | Comparative example |
| | | Central portion | 1.856 | 0.983 | Comparative example |
| | | Tailing end | 1.912 | 0.918 | Comparative example |
| | Added | Leading end | 1.925 | 0.845 | Example of this invention |
| | | Central portion | 1.922 | 0.856 | Example of this invention |
| | | Tailing end | 1.923 | 0.843 | Example of this invention |
| C | Not added | Leading end | 1.923 | 0.857 | Comparative example |
| | | Central portion | 1.884 | 0.948 | Comparative example |
| | | Tailing end | 1.924 | 0.852 | Comparative example |
| | Added | Leading end | 1.939 | 0.792 | Example of this invention |
| | | Central portion | 1.937 | 0.808 | Example of this invention |
| | | Tailing end | 1.938 | 0.802 | Example of this invention |
| D | Not added | Leading end | 1.923 | 0.858 | Comparative example |
| | | Central portion | 1.887 | 0.944 | Comparative example |
| | | Tailing end | 1.922 | 0.856 | Comparative example |
| | Added | Leading end | 1.938 | 0.797 | Example of this invention |
| | | Central portion | 1.937 | 0.811 | Example of this invention |
| | | Tailing end | 1.938 | 0.798 | Example of this invention |

EXAMPLE 8

Steel slabs respectively having composition E to J shown in Table 4 were heated to 1390° C., followed by hot rolling to produce hot-rolled steel sheets each having a thickness of 2.0 ram. Then, an annealing process was performed at 1180° C. for 30 seconds, after which the steel sheets were rapidly cooled with mist water to room temperature at a rate of 40° C./second. Then, the steel sheets were pickled to remove a major portion of the scales.

The foregoing coils were rolled with six passes by a Sendzimir mill to a final thickness of 0.35 mm. Heat generated due to the rolling operation was used to perform a warm rolling at 150° C. to 230° C. in the second and ensuing passes.

A fatty acid of tallow was, by 0.5 wt %, added to the rolling oil and the roll coolant oil to act as an oxidation inhibitor for the steel sheet.

During the winding by the Sendzimir mill, the coil winding apparatus was surrounded by a box-type structure into which $N_2$ gas was injected so that the concentration of oxygen in the atmosphere was limited to 0.1 vol % to 1 vol %.

Each coil was then degreased and subjected to a decarburizing annealing process at 850° C. for two minutes in an atmosphere consisting of 50 vol % $H_2$ with the balance substantially consisting of $N_2$, the dew-point of the atmosphere being 55° C. Then, MgO containing $TiO_2$ by 8 wt % was applied as an annealing separator, followed by winding the coils and subjecting them to a final annealing process.

The final annealing process was performed such that the coils were heated to 850° C. at a rate of 30° C./hour in an atmosphere of $N_2$, after which the temperature was raised to 1200° C. at a rate of 15° C./hour in an atmosphere consisting of 25 vol % $N_2$ and 75 vol % $H_2$. The temperature was then maintained at 1200° C. for 5 hours in an atmosphere of $H_2$.

After the final annealing process had been completed, non-reacted portions of the separator were removed, and tension coating liquid containing magnesium phosphate and colloidal silica was applied. A flattening annealing process, which also baked the coating liquid, was performed at 800° C. for one minute.

Results of the magnetic characteristic evaluations at the leading portion, the central portion and the tailing end of each coil are shown in Table 9.

As is shown in Table 9, the magnetic characteristics of all samples were not deteriorated at the central portion of each coil.

TABLE 9

| STEEL No. | POSITION IN THE COIL: LEADING END Bg (T) | LEADING END $W_{17/50}$ (W/kg) | CENTRAL PORTION Bg (T) | CENTRAL PORTION $W_{17/50}$ (W/kg) | TAILING END Bg (T) | TAILING END $W_{17/50}$ (W/kg) |
|---|---|---|---|---|---|---|
| E | 1.938 | 1.041 | 1.939 | 1.044 | 1.940 | 1.032 |
| F | 1.935 | 1.073 | 1.935 | 1.098 | 1.936 | 1.084 |
| G | 1.937 | 1.055 | 1.937 | 1.060 | 1.938 | 1.060 |
| H | 1.936 | 1.083 | 1.936 | 1.084 | 1.937 | 1.063 |
| I | 1.940 | 1.035 | 1.939 | 1.043 | 1.941 | 1.035 |
| J | 1.941 | 1.042 | 1.940 | 1.037 | 1.942 | 1.038 |

EXAMPLE 9

Six steel slabs respectively having compositions K to P shown in Table 4 were heated to 1390° C., followed by hot rolling to produce hot-rolled steel sheets each having a thickness of 1.8 mm. Then, the steel sheets were subjected to an annealing process at 1000° C. for one minute, followed by a pickling. The steel sheets were then wound by a tandem rolling mill having four stands so that each steel sheet had a thickness of 0.90 mm. At this time, the quantity of the coolant oil was limited so as to gradually raise the temperatures of the steel sheets at the outlet of the roll bite to 80° C., 110° C., 150° C. and 210° C., respectively. Furthermore, $N_2$ gas was sprayed at the roll bite outlet of the final stand so that liquid on the upper and lower surfaces of each steel sheet was removed.

The temperature of each of the coils was maintained at 200° C. for one hour in a box-type furnace in a atmosphere of $N_2$, and then the same tandem mill was used so that each coil had a final thickness of 0.29 mm. At this time, the quantity of the strip coolant oil was again limited to gradually raise the temperatures of the steel sheets at the outlet of the roll bite to 120° C., 170° C., 210° C. and 220° C., respectively. Then, $N_2$ gas was sprayed at the roll bite outlet of the final stand so that liquid on the upper and lower surfaces of the steel sheets was removed.

After the cold rolling process had been completed, each coil was degreased and subjected a decarburizing annealing process at 850° C. for 2 minutes in a furnace, the atmosphere of which consisted of 50 vol % $H_2$ with the balance substantially consisting of $N_2$, the dew point of which was 55° C. Then, MgO, containing $TiO_2$ by 8 wt % and $Sr(OH)_2 \cdot 8H_2O$ by 3 wt %, was applied as an annealing separator, followed by winding the coils. Then, the coils were subjected to a final annealing process.

The final annealing process was performed such that the coils were heated to 850° C. at a rate of 30° C./hour in an atmosphere of $N_2$, and then the temperature was raised to 1200° C. at a rate of 15° C./hour in an atmosphere consisting of 25 vol % $N_2$ and 75 vol % $H_2$. Then, the temperature was maintained at 1200° C. for 5 hours in an atmosphere of $H_2$.

After the final annealing process had been completed, non-reacted portions of the separator were removed, and tension coating liquid containing aluminum phosphate and colloidal silica was applied. The coils were then subjected to a flattening annealing process at 800° C. for one minute, which also baked the coating liquid.

Results of the magnetic characteristic evaluations of the leading portion, the central portion and the tailing end of each coil are shown in Table 10.

As is shown in Table 10, the magnetic characteristics of all samples were not deteriorated at the central portion of each coil.

TABLE 10

| | POSITION IN THE COIL | | | | | |
|---|---|---|---|---|---|---|
| | LEADING END | | CENTRAL PORTION | | TAILING END | |
| STEEL No. | Bg (T) | $W_{17/50}$ (W/kg) | Bg (T) | $W_{17/50}$ (W/kg) | Bg (T) | $W_{17/50}$ (W/kg) |
| K | 1.942 | 0.947 | 1.942 | 0.948 | 1.943 | 0.945 |
| L | 1.932 | 0.972 | 1.932 | 0.974 | 1.931 | 0.975 |
| M | 1.930 | 0.980 | 1.929 | 0.980 | 1.931 | 0.976 |
| N | 1.952 | 0.941 | 1.951 | 0.940 | 1.953 | 0.940 |
| O | 1.941 | 0.952 | 1.940 | 0.959 | 1.940 | 0.963 |
| P | 1.942 | 0.948 | 1.941 | 0.948 | 1.941 | 0.956 |

According to the present invention, when a grain-oriented silicon steel sheet containing Al is manufactured in such a manner that a heat effect treatment is performed in a cold rolling process, deterioration in the magnetic characteristics occurring at the central portion of the coil can effectively be prevented. Thus, a grain-oriented silicon steel sheet having excellent magnetic characteristics for the overall length of the coil can be obtained.

Although this invention has been described in connection with specific forms thereof, equivalent steps may be substituted, the sequence of the steps may be varied, and certain steps may be used independently of others. Further, various other control steps may be included, all without departing from the spirit and scope of the invention defined in the appended claims.

What is claimed is:

1. A method of manufacturing a grain-oriented silicon steel sheet which exhibits excellent magnetic characteristics over the entire length of a coil thereof, comprising the steps of:

hot rolling a silicon steel slab that contains aluminum to form a steel sheet;

annealing said steel sheet, as the need arises;

cold rolling said steel sheet to a final thickness, said cold rolling comprising one pass or plural passes including an intermediate annealing;

performing a heat effect treatment, said heat effect treatment being selected from the group consisting of a coil heating process performed before said cold rolling, a warm rolling process performed during said cold rolling, an aging heat treatment performed during said cold rolling, a heat maintenance process performed during said cold rolling, and a heat maintenance process performed after said cold rolling, said heat effect treatment being performed in an atmosphere having an oxygen concentration of about 10 vol % or lower;

performing a decarburizing annealing on said steel sheet after said cold rolling and said heat effect treatment; and performing a final annealing after said decarburizing annealing on said steel sheet;

whereby nitriding of said steel sheet during said final annealing is minimized so that excellent magnetic characteristics are maintained over the entire length of said steel sheet.

2. A method of manufacturing a grain-oriented silicon steel sheet which exhibits excellent magnetic characteristics over the entire length of a coil thereof, comprising the steps of:

hot rolling a silicon steel slab that contains aluminum to form a steel sheet;

annealing said steel sheet, as the need arises;

cold rolling said steel sheet to a final thickness, said cold rolling comprising one stage or plural stages including an intermediate annealing, said steel sheet having a liquid thereon during said cold rolling, said cold rolling also including a step wherein the amount of said liquid is reduced during at least one pass of said cold rolling, said step being performed in a downstream region from a roll bite outlet of said cold rolling to a position at which said steel is wound;

performing a heat effect treatment, said heat effect treatment being selected from the group consisting of a coil heating process performed before said cold rolling, a warm rolling process performed during said cold rolling, an aging heat treatment performed during said cold rolling, a heat maintenance process performed during said cold rolling, and a heat maintenance process performed after said cold rolling;

performing a decarburizing annealing on said steel sheet; and performing a final annealing on said steel sheet;

whereby nitriding of said steel sheet during said final annealing is minimized so that excellent magnetic characteristics are maintained over the entire length of said steel sheet.

3. A method of manufacturing a grain-oriented silicon steel sheet which exhibits excellent magnetic characteristics over the entire length of a coil thereof, comprising the steins of:

hot rolling a silicon steel slab that contains aluminum to form a steel sheet;

annealing said steel sheet, as the need arises;

cold rolling said steel sheet to a final thickness, said cold rolling comprising one stage or plural stages including an intermediate annealing, wherein at least one of the group consisting of rolling oil, roll coolant oil and strip coolant oil is used in said cold rolling, and an inhibitor for inhibiting oxidation of said steel sheet is added to at least one of said group;

performing a heat effect treatment, said heat effect treatment being selected from the group consisting of a coil heating process performed before said cold rolling, a warm rolling process performed during said cold rolling, an aging heat treatment performed during said cold rolling, a heat maintenance process performed during said cold rolling, and a heat maintenance process performed after said cold rolling;

performing a decarburizing annealing on said steel sheet; and performing a final annealing on said steel sheet;

whereby nitriding of said steel sheet during said final annealing is minimized so that excellent magnetic characteristics are maintained over the entire length of said steel sheet.

* * * * *